US009591214B2

United States Patent
Qiu et al.

(10) Patent No.: US 9,591,214 B2
(45) Date of Patent: Mar. 7, 2017

(54) METHOD TO CONTROL LENS OF A CAMERA MODULE, A LENS CONTROL TERMINAL AND A STORAGE MEDIA

(71) Applicant: HISENSE MOBILE COMMUNICATIONS TECHNOLOGY CO., LTD., Qingdao (CN)

(72) Inventors: Xudong Qiu, Qingdao (CN); Hongcheng Wang, Qingdao (CN)

(73) Assignees: HISENSE MOBILE COMMUNICATIONS TECHNOLOGY CO., LTD., Qingdao (CN); HISENSE USA CORPORATION, Suwanee, GA (US); HISENSE INTERNATIONAL CO., LTD., Qingdao (CN)

( * ) Notice: Subject to any disclaimer, the term of this patent is extended or adjusted under 35 U.S.C. 154(b) by 0 days.

(21) Appl. No.: 14/707,365

(22) Filed: May 8, 2015

(65) Prior Publication Data

US 2016/0094786 A1 Mar. 31, 2016

(30) Foreign Application Priority Data

Sep. 28, 2014 (CN) .......................... 2014 1 0506967

(51) Int. Cl.
*H04N 5/232* (2006.01)
*G02B 7/10* (2006.01)

(52) U.S. Cl.
CPC ......... *H04N 5/23241* (2013.01); *G02B 7/102* (2013.01)

(58) Field of Classification Search
CPC ... H04N 5/23241; H04N 5/2254; H04N 5/232
See application file for complete search history.

(56) References Cited

U.S. PATENT DOCUMENTS

| | | | | |
|---|---|---|---|---|
| 6,643,458 B2* | 11/2003 | Sakamoto | .............. | G03B 17/04 348/E5.029 |
| 2003/0174229 A1* | 9/2003 | Kubota | .............. | H04N 5/23241 348/335 |
| 2009/0278976 A1* | 11/2009 | Shibata | .................. | G02B 7/102 348/335 |
| 2011/0115968 A1* | 5/2011 | Yamanaka | ............. | G02B 7/102 348/357 |
| 2012/0076481 A1* | 3/2012 | Heo | .................... | H04N 5/23245 396/90 |
| 2013/0113985 A1* | 5/2013 | Ikeda | ..................... | G02B 7/102 348/347 |

* cited by examiner

*Primary Examiner* — Roberto Velez
*Assistant Examiner* — Tuan Le
(74) *Attorney, Agent, or Firm* — Harness, Dickey & Pierce, P.L.C.

(57) ABSTRACT

Some embodiments in this disclosure provide a method to control lens of a camera module, a lens control terminal and a storage media, wherein the method to control lens of a camera module includes receiving power-off signal of the camera module; controlling the lens moving towards a zero position gradually, till the lens moves back to the zero position; powering off the camera module.

14 Claims, 3 Drawing Sheets

METHOD TO CONTROL LENS OF A CAMERA MODULE, A LENS CONTROL TERMINAL AND A STORAGE MEDIA

CROSS-REFERENCE TO RELATED APPLICATION

This application claims the benefit and priority of Chinese Patent Application No. 201410506967.7 filed Sep. 28, 2014. The entire disclosure of the above application is incorporated herein by reference.

FIELD

The present disclosure relates to the camera technology field, especially to a method to control a lens of a camera module, a lens control terminal and a storage media.

BACKGROUND

This section provides background information related to the present disclosure which is not necessarily prior art.

Currently camera devices on terminals ordinarily have automatic focusing function, and focusing is the key operation to ensure forming clear images. For example voice coil motors are widely used in cellphones, which include a coiled floating device, a magnet, a lens inside the floating device, and a spring piece used to keep the floating device in a floating state. When switched on, the magnet outside the coil interacts with electric current, making the floating device moving against elastic force of the spring piece, so that the camera device could focus automatically.

In practice, after using the camera function in a cellphone or a pad, when user finishes taking pictures, the camera module moves back to a zero position.

SUMMARY

This section provides a general summary of the disclosure, and is not a comprehensive disclosure of its full scope or all of its features.

Some embodiments in this disclosure provide a method to control a lens of a camera module, the method to control the lens of the camera module includes receiving a power-off signal of the camera module; controlling the lens moving towards a zero position gradually, till the lens moves back to the zero position; powering off the camera module.

Other embodiments in this disclosure provide a lens control terminal of a camera module, wherein, including: a memory and one or more processors, wherein the memory stores one or more computer readable program codes, and the one or more processors are configured to perform the one or more computer readable program codes to implement: receiving a power-off signal of the camera module; controlling a lens of the camera module moving towards a zero position gradually, till the lens moves back to the zero position; powering off the camera module.

Some embodiments in this disclosure provide a computer readable storage media, wherein the storage media stores indication codes, the indication codes are configured to be performed to enable the user equipment to perform the following operations: receiving a power-off signal of a camera module; controlling a lens of the camera module moving towards a zero position gradually, till the lens moves back to the zero position; powering off the camera module.

Further aspects and areas of applicability will become apparent from the description provided herein. It should be understood that various aspects of this disclosure may be implemented individually or in combination with one or more other aspects. It should also be understood that the description and specific examples herein are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

DETAILED DESCRIPTION

Example embodiments will now be described more fully with reference to the accompanying drawings.

Figure 1:
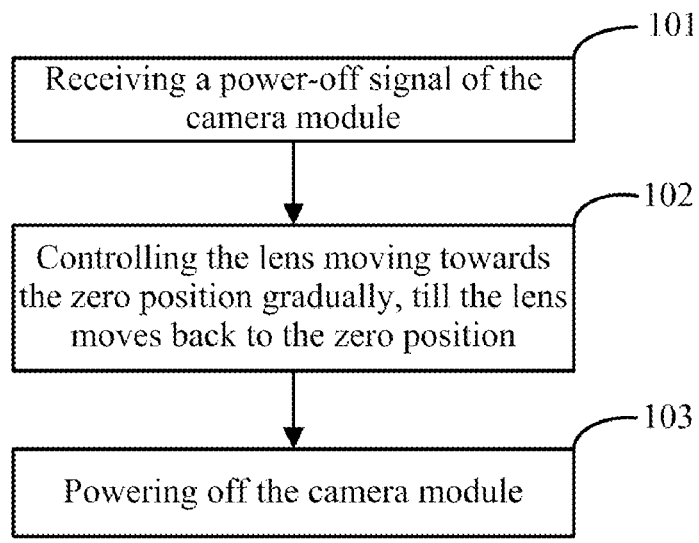
FIG. 1 is a flowchart of a method to control lens of a camera module in some embodiments provided in this disclosure.

As shown in FIG. 1, some embodiments in this disclosure disclose a method to control a lens of a camera module, including the following operations:

Operation 101. Receiving a power-off signal of the camera module.

The terminals referred in this disclosure include but not limit to a camera and an electronic equipment which has a camera, the electronic equipment could be a cellphone, a pad, and a laptop. The camera includes a camera module. When camera applications are performed, the power supply powers up the camera module, providing driving electric current for the motor. When the user enters into other applications or when there is an incoming call or when the terminal automatically powers off, the terminal needs to quit the camera application, and a power-off signal is created. Currently, when receiving the power-off signal of the camera module, the camera module will be powered off immediately, thus the driving electric current for the motor will be cut off, which causing the camera to move back because of lack of motor drive. In the embodiments of this disclosure, when receiving the power-off signal of the camera module, the camera module will not be powered off immediately. Instead, the Operation 102 will be performed.

Operation 102. controlling the lens moving towards the zero position gradually, till the lens moves back to the zero position.

In some embodiments, when the driving electric current for the motor is zero, the lens moves by the elastic force of the spring piece, till the lens reaches the position in which the lens touches other parts on the bottom of the camera module. Such position may be the zero position of the lens.

When the lens is not at the zero position, the lens will be controlled moving towards the zero position in several times. The lens moves a certain distance each time, doesn't move to the zero position in one time. Thus an abnormal sound and structure damages caused by lens suddenly moving back to zero position in one time may be avoided.

Operation 103. Powering off the camera module.

After finishing above Operations 101-102, the lens is at the zero position, then it powers off the camera module.

Some embodiments of this disclosure ensure that before powering off the camera module, confirming the lens is not at the zero position, and forcing the lens to move back to the zero position. Such move is gradual. Therefore, it avoids abnormal sound and structure damages caused by lens suddenly moving back to the zero position in one time when losing drive force from the motor.

Figure 2:
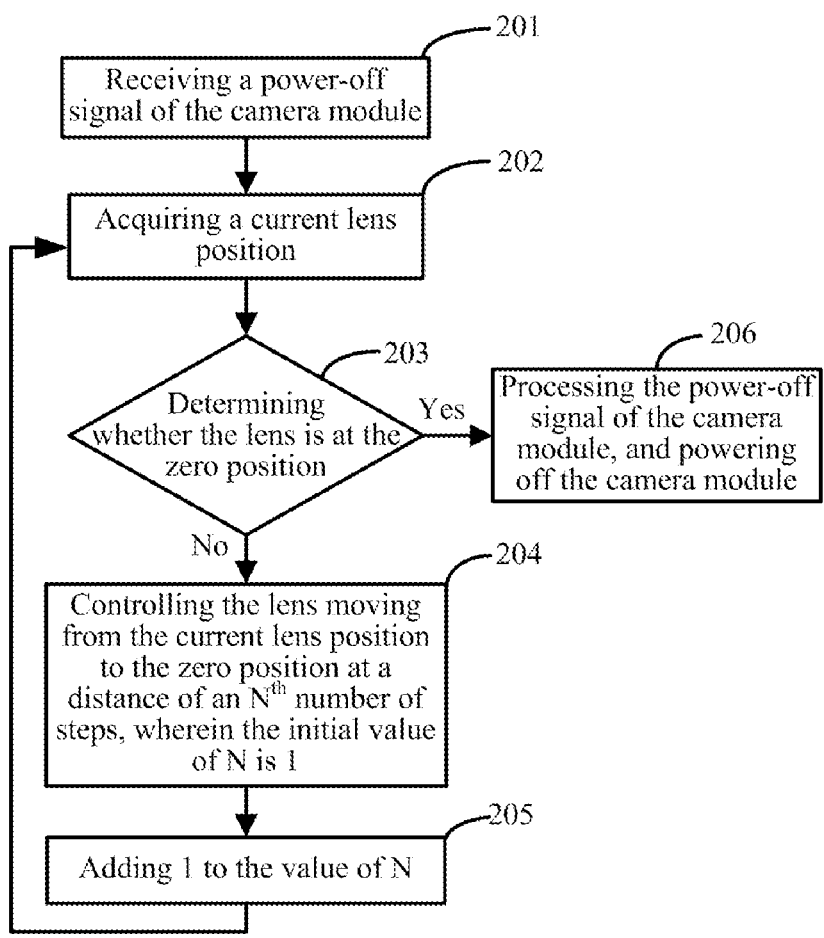
FIG. 2 is a flowchart of a method to control lens of a camera module in some embodiments provided in this disclosure.

As shown in FIG. 2, some embodiments in this disclosure disclose a method to control a lens of a camera module, including the following operations:

Operation 201. Receiving a power-off signal of the camera module.

Operation 202. Acquiring a current lens position.

In some embodiments, the distance between the zero position to the position where the lens is farthest from the CCD image sensor is divided, and the distance may be divided evenly into several even length distance. One such even length may be a distance unit, and each distance unit may be one step. For example, the number of steps between the lens and the zero position (for example, when the lens is 10 steps from the zero position, the number of steps between the lens and the zero position is 10, herein the number of steps intends to express there are how many steps) can be used to determine the current position of the lens. Since when focusing the lens, the lens' movement is implemented by controlling the magnitude of the electric current of the driving motor, thus the number of the steps between the lens and the zero position could be determined by reading the electric current value.

Operation 203. Determining whether the lens is at the zero position, and if the lens is at the zero position, perform Operation 206. Otherwise, perform Operation 204.

Determining whether the lens is at the zero position can be performed by determining whether the electric current value of the driving motor is zero. If the electric current value is zero, it may mean the lens is at the zero position.

Operation 204. When the lens is not at the zero position, controlling the lens moving from the current lens position to the zero position at a distance of an $N^{th}$ number of steps, wherein the initial value of N is 1.

When the electric current value of the driving motor is not zero, the lens is not at the zero position, moving the lens to the zero position at a distance of an $N^{th}$ number of steps. If the value of the $N^{th}$ number of steps is 3, the distance of the $N^{th}$ number of steps is a distance of three steps, then the lens moves to the zero position by the distance of three steps. It is to be understood that the value of the $N^{th}$ number of steps may be changed according to the circumstances.

Operation 205. Adding 1 to the value of N, and repeating Operations 202-204, till the lens is back at the zero position.

This operation can be implemented by determining if the lens is back at zero position. If the lens is at the zero position, it means the lens is back at the zero position after the last move, and Operation 206 may be performed. Otherwise, controlling the lens to move towards the zero position by a distance of the second number of steps (taking the number of steps in the last move is the first number of steps as an example). The above operations may be repeated till the lens is back at the zero position.

Operation 206. Processing the power-off signal of the camera module, and powering off the camera module.

In some embodiments, moving the lens to the zero position gradually is realized by repeating the determination of whether the lens is at the zero position and not moving a certain distance.

Figure 3:
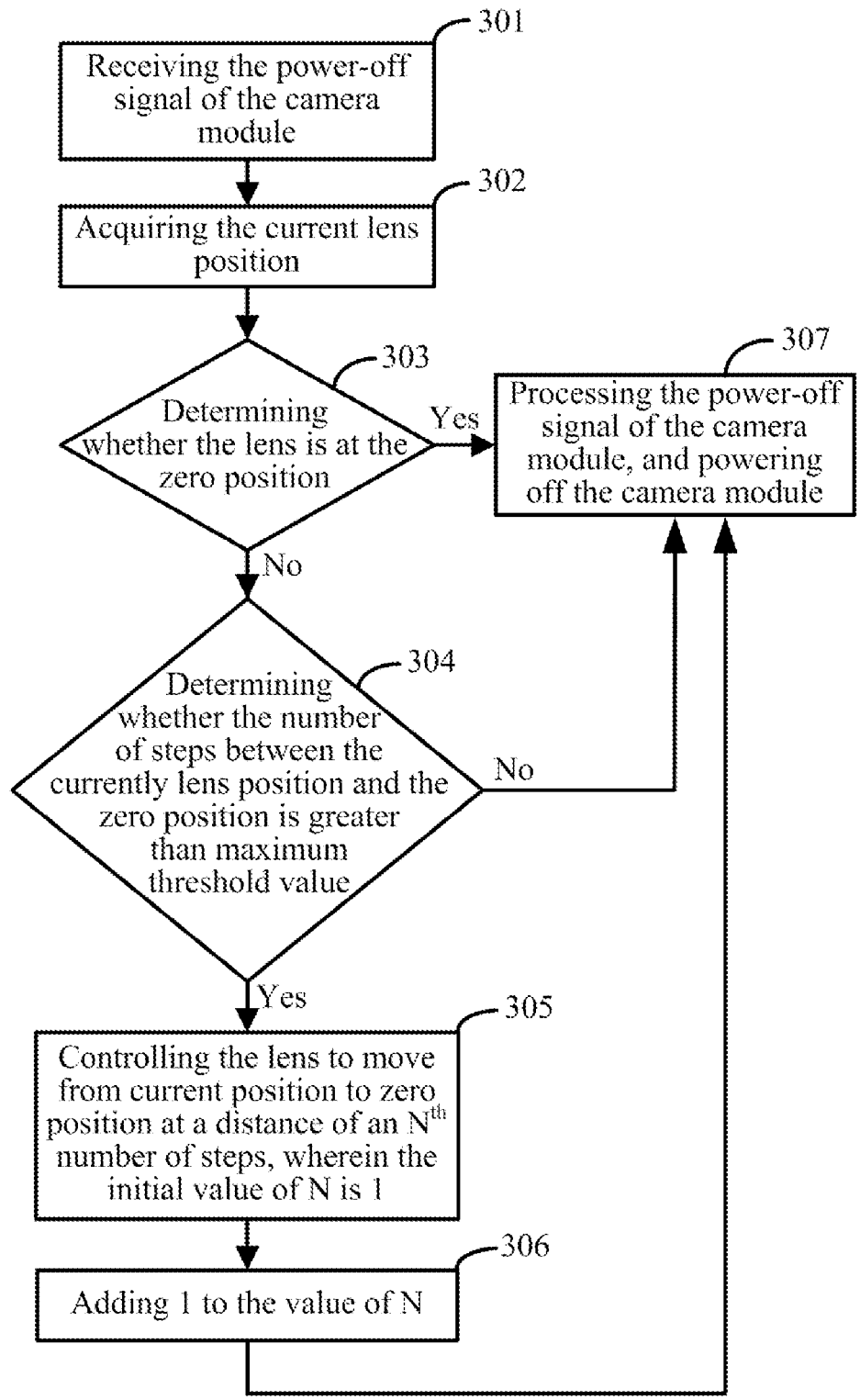
FIG. 3 is a flowchart of a method to control lens of a camera module in some embodiments provided in this disclosure.

As shown in FIG. 3, some embodiments in this disclosure disclose a method to control a lens of a camera module, including the following operations:

Operation 301. Receiving the power-off signal of the camera module.

Operation 302. Acquiring the current lens position.

Operation 303. Determining whether the lens is at the zero position. If the lens is at the zero position, perform Operation 307. Otherwise, perform Operation 304.

Operation 304. If the lens is not at the zero position, determining whether the number of steps between the current lens position and the zero position is greater than maximum threshold value. If it is greater than the maximum threshold value, perform Operation 305; otherwise, perform Operation 307.

In some embodiments, the maximum threshold value may be preset, which is the corresponding number of steps of the distance which the lens moves back to the zero position in one time without causing an abnormal sound or structure damages. For example, when the maximum threshold value is 32, in practice, when the lens moves back to the zero position in one time of the distance of 32 steps from the zero position, the movement almost causes no abnormal sound or structure damages. When the lens moves back to the zero position in one time of the distance of 33 steps from the zero position, the movement causes abnormal sound or structure damages. Therefore, the maximum threshold value is reasonably set. Herein, in practice, the maximum threshold value can be adjusted to enable the lens to move a relatively long distance without causing abnormal sound or structure damages.

When the number of the steps between the current lens position to the zero position is no more than the maximum threshold value, it means the lens may move back to the zero position from the current lens position in one time, without causing abnormal sound or structure damages.

Operation 305. Controlling the lens moving from the current lens position to the zero position at a distance of the $N^{th}$ number of steps, wherein the initial value of N is 1.

Operation 306. Adding 1 to the value of N, and repeating Operations 302-305, till the lens is back at the zero position.

The initial value of N is 1, and the number of steps of the first lens move is the first number of steps, and the number of steps of the second lens move is the second number of steps, so on so forth. Making the number of steps of the last lens move as the $m^{th}$ number of steps.

In some embodiments, each of the numbers of steps from the first number of steps to the $m^{th}$ number of steps may be identical, which means the lens moves an even distance each time. Thus controlling the lens moving towards the zero position gradually till the lens moves back to the zero position in Operation 102 includes: controlling the lens moving towards the zero position periodically till the lens moves back to the zero position.

In some embodiments, each of numbers of steps from the first number of steps to the $m^{th}$ number of steps may be greater than the next one. For example, when the lens is at a position 300 steps from the zero position. In the first move the lens may move a distance of 100 steps, and in the second move the lens may move a distance of 100 steps, and in the third move the lens may move a distance of 70 steps. At this time the lens is 30 steps away from the zero position, which is less than the maximum threshold value 32, which concludes the process. Therefore, the lens may move a longer distance in the first couple of moves, and the distance reduces accordingly, allowing the lens to get back to the zero position as soon as possible without causing abnormal sound or structure damages.

In some embodiments, such number of steps from first to $m^{th}$ can be chosen from a preset table.

For illustration, as shown in Table 1.

TABLE 1

| | number of steps range | | | |
|---|---|---|---|---|
| number of steps of current lens position | 0-100 | 101-200 | 201-300 | ... |
| First number of steps | 32 | 60 | 100 | ... |
| Second number of steps | 32 | 32 | 60 | ... |
| ... | ... | ... | ... | ... |
| $m^{th}$ number of steps | 32 | 32 | 32 | ... |

When the number of steps of the current lens position is within 0-100, the first number of steps may be set at 32. When the number of steps of the current lens position is within 101-200, each one of the first number of steps may be set at 60 and the second number of steps to the $m^{th}$ number of steps may be set at 32. When the number of steps of current lens position is within 201-300, the first number of steps may be set at 100, and the second number of steps may be set at 60 and each one of the third number of steps to the $m^{th}$ number of steps may be set at 32. From above table, setting the first couple of moves at greater number of steps can enable the lens to get back to the zero position as soon as possible. Setting the last couple of moves at a lesser number of steps and setting each at the maximum threshold value 32 can stop the lens from moving too far when back to the zero position and avoid collision.

Operation 307. Processing the power-off signal of the camera module, and powering off the camera module.

Above embodiments are described as combinations of actions for convenience. However it is to be understood by person skilled in this art that this disclosure is not limited by the sequences of the actions, because according to this disclosure, some operations may be performed in other sequences or simultaneously. Further, it is to be understood by person skilled in this art, that embodiments in this disclosure are preferred embodiments, wherein the related actions and modules may not be necessary for this disclosure.

Figure 4:
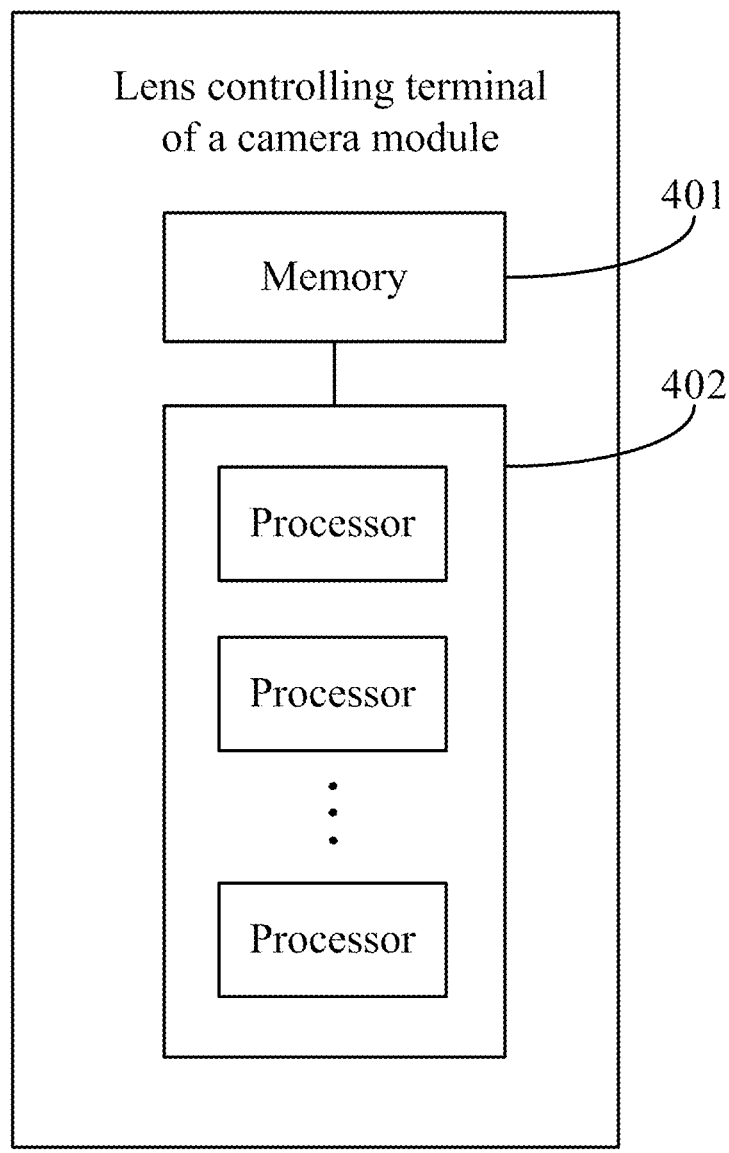
FIG. 4 is a structural illustration of a lens control terminal of a camera module in some embodiments provided in this disclosure.

As shown in FIG. 4, some embodiments in this disclosure provide a lens controlling terminal of a camera module, which includes a memory 401 and one or more processors 402, wherein the memory 401 stores one or more computer readable program codes, and the one or more processors are used to perform the one or more computer readable program codes to implement:

Receiving a power-off signal of the camera module.

Controlling the lens moving towards the zero position gradually, till the lens moves back to the zero position.

Powering off the camera module.

Herein controlling the lens moving towards the zero position gradually, till the lens moves back to the zero position, including a process, the process includes:

S1: acquiring the current lens position;

S2: determining whether the lens is at the zero position;

S3: if the lens is not at the zero position, controlling the lens moving from the current lens position to the zero position at a distance of a $N^{th}$ number of steps;

S4: adding the value of N by 1, and repeating S1-S3, till the lens is back at the zero position; wherein the initial value of N is 1.

In some embodiments, after determining whether the lens is at the zero position, the one or more processors 402 may be further used to perform such one or more computer readable codes to implement:

If the lens is not at the zero position, determining whether the number of steps between the current lens position and the zero position is greater than the maximum threshold value; if greater than the maximum threshold value, performing S3; if not, end the process. Furthermore, setting the last move to distance of a number of steps of $m^{th}$ number of steps, wherein each of numbers of steps from the first number of steps to the $m^{th}$ number of steps is greater than the next one. The each of the numbers of steps from the first number of steps to the $m^{th}$ number of steps may be chosen from a preset list.

In some embodiments, each of the numbers of steps from the first number of steps to the $m^{th}$ number of steps is the same.

For device embodiments, because they are substantially the same as the method embodiments, the description is relatively simple. Relevant parts could be referred to description of the method embodiments.

Every embodiment in this disclosure is described evolutionary, every embodiment focuses on the features different from the other embodiments, and the same parts of every embodiment are cross-reference.

Besides, some embodiments in this disclosure provide a computer readable storage media which stores indication codes. The indication codes are configured to be performed to enable the user equipment to perform the following operations: receiving power-off signal of the camera module; controlling the lens moving towards the zero position gradually, till the lens moves back to the zero position; powering off the camera module.

In some embodiments, when the lens is confirmed not at the zero position, controlling the lens moving towards the zero position gradually, till the lens moves back to the zero position, including a process, the process includes:

S1: acquiring the current lens position;

S2: determining whether the lens is at the zero position;

S3: if the lens is not at the zero position, controlling the lens moving from the current lens position to the zero position at a distance of a $N^{th}$ number of steps;

S4: adding the value of N by 1, and repeating S1-S3, till the lens is back at the zero position; wherein the initial value of N is 1.

In some other embodiments, determining whether the lens is at the zero position further includes: if the lens is not at the zero position, determining whether the operation value between the current lens position and the zero position is greater than the maximum threshold value; if greater than the maximum threshold value, performing S3; if not, ending the process.

In some embodiments, when repeating S1-S3, it sets the last move to a distance of a $m^{th}$ number of steps, wherein each of the numbers of steps from the first number of steps to the $m^{th}$ number of steps is greater than the next one.

In some embodiments, the value of each of the numbers of steps from the first number of steps to the $m^{th}$ number of steps may be chosen from a preset list.

In some embodiments, each of the numbers of steps from the first number of steps to the $m^{th}$ number of steps may be identical.

Although some embodiments of this disclosure have been disclosed, persons skilled in this art may also make additional modifications or alternations once they know the basic inventive concepts. Therefore, what is claimed here shall be construed to include preferred embodiments as well as any and all modifications and alternations that fall into the scope of this disclosure.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

The invention claimed is:

1. A method to control a lens of a camera module, the method comprising:
   receiving a power-off signal of the camera module;
   acquiring a current lens position;
   determining whether the lens is at a zero position;
   if the lens is not at the zero position, determining whether a number of steps between the current lens position and the zero position is greater than a maximum threshold value;
   when the determined number of steps between the current lens position and the zero position is not greater than the maximum threshold value, ending the process;
   when the determined number of steps between the current lens position and the zero position is greater than the maximum threshold value, moving the lens from the current lens position towards the zero lens position by a distance corresponding to an $N^{th}$ number of steps, increasing a value of N by 1, and repeating the steps of acquiring, determining whether the lens is at a zero position, determining whether the number of steps between the current lens position and the zero position is greater than a maximum threshold, and moving, until the lens is at the zero position; and
   powering off the camera module;
   wherein an initial value of N is 1, and wherein the maximum threshold is a number of steps corresponding to a distance by which the lens can move to the zero position in one movement without causing an abnormal sound or structural damage.

2. The method of claim 1, wherein: when repeating the steps of acquiring, determining whether the lens is at a zero position, determining whether the number of steps between the current lens position and the zero position is greater than a maximum threshold, and moving, the method further comprising setting a last move distance to a $m^{th}$ number of steps, wherein each of the numbers of steps from a first number of steps to the $m^{th}$ number of steps is greater than a next one.

3. The method of claim 2, wherein: each of the numbers of steps from the first number of steps to the $m^{th}$ number of steps is chosen from a preset list.

4. The method of claim 2, wherein: each of the numbers of steps from the first number of steps to the $m^{th}$ number of steps is identical.

5. The method of claim 1, wherein
   moving the lens includes moving the lens towards the zero position periodically until the lens moves back to the zero position.

6. A lens control terminal of a camera module, the lens control terminal comprising:
   a memory and one or more processors, wherein the memory stores one or more computer readable program codes, and the one or more processors are configured to perform the one or more computer readable program codes to implement:
   receiving a power-off signal of the camera module;
   acquiring a current lens position;
   determining whether the lens is at a zero position;
   if the lens is not at the zero position, determining whether a number of steps between the current lens position and the zero position is greater than a maximum threshold value;
   when the determined number of steps between the current lens position and the zero position is not greater than the maximum threshold value, ending the process;
   when the determined number of steps between the current lens position and the zero position is greater than the maximum threshold value, moving the lens from the current lens position towards the zero lens position by a distance corresponding to an $N^{th}$ number of steps, increasing a value of N by 1, and repeating the steps of acquiring, determining whether the lens is at a zero position, determining whether the number of steps between the current lens position and the zero position is greater than a maximum threshold, and moving, until the lens is at the zero position; and
   powering off the camera module;
   wherein an initial value of N is 1, and wherein the maximum threshold is a number of steps corresponding to a distance by which the lens can move to the zero position in one movement without causing an abnormal sound or structural damage.

7. The terminal of claim 6, further comprising: setting a last move distance to a $m^{th}$ number of steps, wherein each of the numbers of steps from a first number of steps to the $m^{th}$ number of steps is greater than a next one.

8. The terminal of claim 7, wherein: each of the number of steps from the first number of steps to the $m^{th}$ number of steps is chosen from a preset list.

9. The terminal of claim 7, wherein: each of the numbers of steps from the first number of steps to the $m^{th}$ number of steps is identical.

10. The terminal of claim 6, wherein
    moving the lens includes moving the lens towards the zero position periodically until the lens moves back to the zero position.

11. A non-transitory computer readable storage media, wherein the non-transitory storage media includes indication codes, the indication codes configured to be performed to enable user equipment to perform the following operations:
    receiving a power-off signal of a camera module;
    acquiring a current lens position;
    determining whether the lens is at a zero position;
    if the lens is not at the zero position, determining whether a number of steps between the current lens position and the zero position is greater than a maximum threshold value;
    when the determined number of steps between the current lens position and the zero position is not greater than the maximum threshold value, ending the process;
    when the determined number of steps between the current lens position and the zero position is greater than the maximum threshold value, moving the lens from the current lens position towards the zero lens position by a distance corresponding to an $N^{th}$ number of steps, increasing a value of N by 1, and repeating the steps of acquiring, determining whether the lens is at a zero position, determining whether the number of steps between the current lens position and the zero position is greater than a maximum threshold, and moving, until the lens is at the zero position; and powering off the camera module;

wherein an initial value of N is 1, and wherein the maximum threshold is a number of steps corresponding to a distance by which the lens can move to the zero position in one movement without causing an abnormal sound or structural damage.

12. The storage media of claim 11, wherein: when repeating the steps of acquiring, determining whether the lens is at a zero position, determining whether the number of steps between the current lens position and the zero position is greater than a maximum threshold, and moving, the method further comprising setting a last move distance to a $m^{th}$ number of steps, wherein each of the numbers of steps from a first number of steps to the $m^{th}$ number of steps is greater than a next one.

13. The storage media of claim 12, wherein: each of the numbers of steps from the first number of steps to the $m^{th}$ number of steps is chosen from a preset list.

14. The storage media of claim 12, wherein: each of the numbers of steps from the first number of steps to the $m^{th}$ number of steps is identical.

* * * * *